March 28, 1944.   W. B. SHANLEY   2,344,950
CONVERSION OF HYDROCARBONS
Filed June 30, 1941
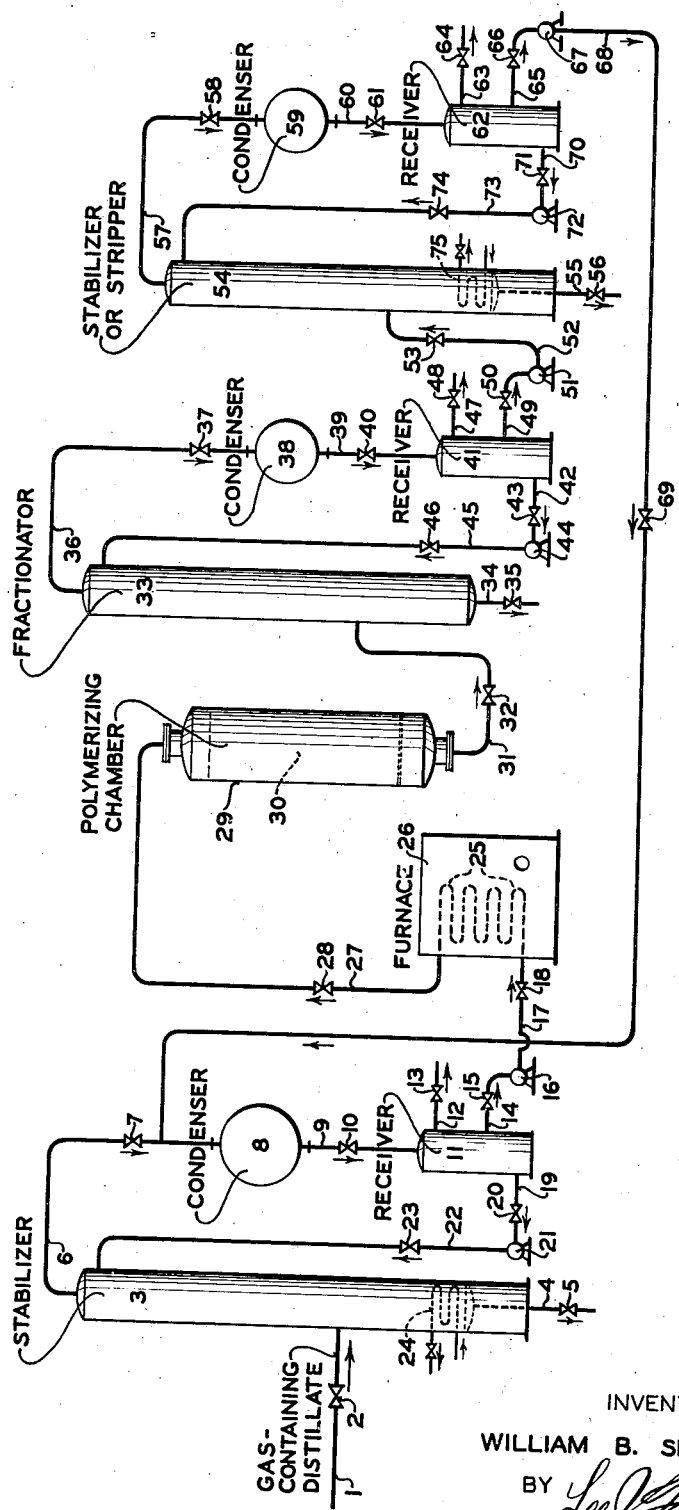
INVENTOR
WILLIAM B. SHANLEY
BY Lee J. Gary
ATTORNEY

UNITED STATES PATENT OFFICE 2,344,950

CONVERSION OF HYDROCARBONS

William B. Shanley, Chicago, Ill., assignor to Universal Oil Products Company, Chicago, Ill., a corporation of Delaware Application June 30, 1941, Serial No. 400,421

2 Claims. (Cl. 260—683.1)

The invention relates to improvements in the operation of a process for the polymerization of propylene, the operation including recovery of the propylene from the normally gaseous products of a cracking operation. The improvements provided by the invention insure more complete recovery of the propylene components of the cracked gases for use as polymerization stock and thereby increase the yield of polymer gasoline produced.

To avoid the use of gas compressors for supplying normally gaseous charging stock to a polymerizing system, it is good practice to substantially condense the normally gaseous polymerizing stock and supply it to the polymerizing system in liquid state. This procedure is not difficult when the normally gaseous fractions to be polymerized consist essentially of or contain substantial quantities of the relatively easily condensible 4-carbon atom fractions, such as butanes and butylenes. However, it is sometimes desirable to utilize all or a substantial portion of the 4-carbon atom fractions contained in the normally gaseous products of a cracking operation for other purposes. For example, the catalytic alkylation of iso-butane with butylenes is, in some instances, more desirable than polymerization of the butylenes. In such instances, concentration of the 3-carbon atom fractions in liquid state for polymerization treatment is made much more difficult due to the absence of the 4-carbon atom fractions and the resulting higher vapor pressure of the material subjected to condensation.

The present invention provides a method and means of obviating the difficulty above mentioned without resorting to the use of compressors or to refrigeration for condensing the polymerization stock. This is accomplished by leaving a relatively small quantity of 4-carbon atom fractions, including butanes, in the 3-carbon atom fractions comprising the polymerization stock and, after polymerizing olefinic components of the mixture, separating unconverted paraffinic 4-carbon atom fractions from lighter and heavier products of the polymerizing step and returning the said 4-carbon atom fractions to the same condensing step whereto the 3-carbon atom fractions to be polymerized are supplied, to assist condensation of the latter.

Since the paraffinic 4-carbon atom fractions remain unconverted in the catalytic polymerizing step, recirculation of these fractions, in the manner above mentioned, will serve to build up any desired proportion of 4-carbon atom fractions in the charging stock for the polymerization step, even though a quantity of 4-carbon atom fractions in the stream initially supplied to the condenser is relatively small. Thus, while diverting only a relatively small proportion of the total quantity of 4-carbon atom fractions in the mixture from which the polymerization stock is derived to the polymerizing step, a ratio of 4-carbon atom to 3-carbon atom fractions in the polymerizing stock may be maintained sufficiently high by the local circulation of unconverted butanes, to secure substantially complete condensation of the propylene.

The accompanying drawing diagrammatically illustrates an apparatus in which the improved mode of operation provided by the invention may be conducted. The features and advantages of the invention will be more apparent with reference to the drawing and the following description thereof.

Referring to the drawing, gas-containing distillate, such as that derived, for example, from the receiver of an oil cracking system operated for the production of gasoline and olefinic gases, is supplied through line 1 and valve 2 to stabilizer 3, wherein it is fractionated to separate substantially all of the 3-carbon atom and lighter normally gaseous fractions from substantially all of its normally liquid components. Operating conditions in the stabilizer are controlled to leave at least a major portion of the 4-carbon atom components of the distillate supplied to this zone in the stabilized bottoms which are removed therefrom through line 4 and valve 5 to conventional debutanizing equipment, not illustrated, or elsewhere, as desired. However, a small portion of the 4-carbon atom fractions are retained in the stream of lighter gases withdrawn as the overhead product from the stabilizer through line 6. This stream is supplied through valve 7 to condenser 8 and is commingled in line 6, prior to its introduction into the condenser, with recycled butane derived as hereinafter described. The quantity of butane thus recycled is sufficient that substantially complete condensation of the propylene in the overhead stream from stabilizer 3 can be accomplished in condenser 8, utilizing water at the temperature normally available (not over 90 to 95° F., or thereabouts, in most instances) as the cooling medium in the condenser (i. e., without resorting to refrigeration or the use of sub-atmospheric temperatures in condenser 8). The resulting normally gaseous condensate and the light gases which remain uncondensed in condenser 8 are directed therefrom through line 9 and valve 10 to collection and separation in receiver 11. The uncondensed and undissolved light gases, which will consist predominantly of ethane and lighter fractions, are removed from the receiver through line 12 and valve 13 to storage or elsewhere, as desired, while the net make of normally gaseous condensate collected in receiver 11, which consists predominantly of 3 and 4-carbon atom fractions, is directed therefrom through line 14 and valve 15 to pump 16 and supplied therefrom through line 17 and valve 18 to the heating step of the polymerizing system.

To maintain the desired top temperature in stabilizer 3, regulated quantities of the normally gaseous condensate collected in receiver 11 are recycled therefrom through line 19, valve 20, pump 21, line 22 and valve 23 to the upper portion of the stabilizer. The required bottom temperature is maintained in the stabilizer by reboiling the bottoms in this zone, this being accomplished, in the particular case here illustrated, by circulating a suitable heating medium through closed coil 24 disposed in the lower portion of the stabilizing column.

The heating step of the polymerizing system comprises, in this particular instance, a heating coil 25 disposed within a suitable furnace 26 and the normally gaseous condensate supplied to coil 25 from receiver 11 through pump 16, as previously described, is heated in the coil to a temperature sufficient to induce substantially complete polymerization of its olefinic components upon subsequent contact of the heated material with the polymerizing catalyst employed. The heated material is directed from coil 25 through line 27 and valve 28 into polymerizing chamber 29 wherein it contacts the catalyst which, in this particular instance, comprises a fixed bed of solid granular contact material, indicated at 30.

It is, of course, within the scope of the invention to employ two or more polymerizing chambers connected for series or for parallel flow therethrough, although only one is illustrated in the drawing and, when two or more polymerizing chambers are employed, they may be alternately operated so that spent or partially spent catalytic material in one or more of the chambers may be reactivated in situ, while fresh or reactivated catalyst in one or more other chambers is employed for promoting the polymerization reaction.

Products resulting from the polymerizing operation are directed from chamber 29 through line 31 and valve 32 to separation in fractionator 33 which, in this particular instance, is operated to recover as the overhead product from this zone substantially all of the polymers boiling within the range of gasoline and to recover heavier polymers as bottoms from the fractionator. The heavy polymer bottoms are directed from the lower portion of the fractionator through line 34 and valve 35 to cooling and storage or elsewhere, as desired. The overhead vaporous stream from fractionator 33 will include, in addition to the polymer gasoline fractions, substantially all of the normally gaseous paraffinic fractions supplied from receiver 11 to coil 25. This stream is directed through line 36 and valve 37 to condenser 38.

Condenser 38 is operated under conditions regulated to liquefy substantially all of the gasoline boiling range polymers, as well as substantially all of the unconverted butane, leaving a major portion of the lighter gases (principally propane) uncondensed. The resulting condensate and uncondensed gases are directed through line 39 and valve 40 to collection and separation in receiver 41. Regulated quantities of the distillate collected in receiver 41 may be recycled by means of line 42, valve 43, pump 44, line 45 and valve 46 to the upper portion of fractionator 33 to serve as a cooling and refluxing medium in this zone. The uncondensed light gases are released from receiver 41 through line 47, and valve 48 and may be directed to storage or elsewhere, as desired. The net make of gas-containing polymer distillate collected in receiver 41 is directed therefrom through line 49 and valve 50 to pump 51 by means of which it is supplied through line 52 and valve 53 to the stripping or stabilizing column 54. It may, of course, be preheated by well known means, not illustrated, prior to its introduction into column 54 to a temperature sufficient to induce partial vaporization thereof.

Column 54 is preferably operated at temperature and pressure conditions regulated to substantially strip the polymer gasoline of normally gaseous components, although it may, when desired, be operated to leave a regulated portion of the normally gaseous fractions in the stabilized polymer gasoline which is removed from the lower portion of this zone through line 55 and valve 56 to cooling and storage or elsewhere, as desired. In either case, the overhead stream removed from column 54 will consist predominantly of unconverted butanes and a relatively small quantity of propane. This stream is directed through line 57 and valve 58 to condenser 59 wherein substantially all of the butanes are condensed and wherefrom the resulting normally gaseous condensate and uncondensed lighter gases are directed through line 60 and valve 61 to collection and separation in receiver 62.

Uncondensed light gases, consisting predominantly of propane, are removed from receiver 62 through line 63 and valve 64 and may be directed to storage or elsewhere, as desired. The normally gaseous condensate collected in receiver 62, which consists predominantly of unconverted butanes, is recycled by means of line 65, valve 66, pump 67, line 68, valve 69 and line 6 to condenser 8 wherein it serves the purpose previously mentioned.

To maintain the desired top temperature in stabilizing or stripping column 54, normally gaseous condensate from receiver 62 may be recycled in regulated quantities to the upper portion of the column by means of line 70, valve 71, pump 72, line 73 and valve 74. Reboiling of the bottoms in column 54 is accomplished, in the case here illustrated, by passing a suitable heating medium through closed coil 75 in the lower portion of the column in indirect heat exchange with the bottoms in this zone.

The operating conditions, catalysts, etc., which may be employed to produce the desired results in an operation such as herein provided will be apparent to those familiar with the art and no novelty is claimed for any individual step of the process per se, except that of recycling unconverted butane from the polymerizing step to the condensing step to which the propylene polymerization stock is supplied to assist condensation of the latter.

It will be apparent that the features of the invention are applicable generally to reactions involving the conversion or chemical condensation of normally gaseous materials and it is, therefore, not intended to limit the invention to the polymerization of propylene.

I claim as my invention:

1. In the catalytic polymerization of olefins in a mixture of normally gaseous hydrocarbons consisting predominantly of 3 and 4-carbon atom fractions, wherein the fresh charging stock supplied to the polymerizing operation is relatively lean in 4-carbon atom fractions, the steps which comprise separating unconverted butanes from the liquid polymer product and from unconverted propane, commingling butane thus recovered with said fresh charging stock, subjecting the resulting mixture to cooling and condensation, regulating the quantity of butanes thus recycled to insure substantially complete condensation of the propylene in said charging stock mixture and supplying the resulting condensate to the polymerizing operation.

2. The hydrocarbon conversion process which comprises, fractionating a gas-containing distillate, such as that derived by the cracking of hydrocarbon oil, to substantially free the same of 3-carbon atom fractions and form a fractionated gaseous stream containing substantially all of said 3-carbon atom fractions and only a minor portion of the 4-carbon atom components of said distillate, subjecting said stream to cooling and condensation under conditions regulated to substantially completely condense its 3 and 4-carbon atom fractions, separating any lighter uncondensed gases from the resulting condensate, supplying said condensate to a catalytic polymerizing operation and therein polymerizing substantially all of its olefinic components to form liquid polymers of good antiknock value boiling within the range of gasoline, without materially altering the paraffinic components of said condensate, recovering the liquid polymers from the resulting products and separating therefrom at least a substantial proportion of the unconverted normally gaseous fractions, condensing unconverted butane from the latter and returning the same to the first mentioned condensation step in quantities regulated to materially increase the proportion of butanes in the mixture supplied to said condensing step from said fractionating step, whereby to facilitate and insure substantially complete condensation of the propylene therein.

WILLIAM B. SHANLEY.